United States Patent
Polyakov

(10) Patent No.: US 12,217,365 B1
(45) Date of Patent: Feb. 4, 2025

(54) MULTIPLEXING VIDEO STREAMS IN AN AGGREGATE STREAM FOR A THREE-DIMENSIONAL VIRTUAL ENVIRONMENT

(71) Applicant: Katmai Tech Inc., New York, NY (US)

(72) Inventor: Petr Polyakov, Tampa, FL (US)

(73) Assignee: Katmai Tech Inc., New York, NY (US)

( * ) Notice: Subject to any disclaimer, the term of this patent is extended or adjusted under 35 U.S.C. 154(b) by 0 days.

(21) Appl. No.: 18/228,418

(22) Filed: Jul. 31, 2023

(51) Int. Cl.
| | | |
|---|---|---|
| *G06T 19/00* | (2011.01) | |
| *G06T 3/40* | (2006.01) | |
| *G06T 15/04* | (2011.01) | |
| *H04N 19/136* | (2014.01) | |
| *H04N 19/156* | (2014.01) | |
| *H04N 19/172* | (2014.01) | |
| *H04N 19/42* | (2014.01) | |

(52) U.S. Cl.
CPC ............... *G06T 19/00* (2013.01); *G06T 3/40* (2013.01); *G06T 15/04* (2013.01); *H04N 19/136* (2014.11); *H04N 19/156* (2014.11); *H04N 19/172* (2014.11); *H04N 19/42* (2014.11)

(58) Field of Classification Search
CPC .......... G06T 19/00; G06T 3/40; G06T 15/04; H04N 19/136; H04N 19/156; H04N 19/172; H04N 19/42
See application file for complete search history.

(56) References Cited

U.S. PATENT DOCUMENTS

| | | | | |
|---|---|---|---|---|
| 7,634,073 B2 * | 12/2009 | Kanada | ................. | H04M 3/568 |
| | | | | 709/204 |
| 9,007,422 B1 * | 4/2015 | Kwon | ..................... | G06T 7/564 |
| | | | | 348/14.09 |
| 10,979,672 B1 * | 4/2021 | Krol | ........................ | G06F 3/011 |
| 11,522,925 B2 | 12/2022 | Morris et al. | | |
| 11,539,919 B1 * | 12/2022 | Rao | .................. | H04N 21/44016 |
| 11,733,826 B2 * | 8/2023 | Thiel | ....................... | G06T 15/20 |
| | | | | 345/419 |
| 2009/0303311 A1 * | 12/2009 | Stoen | .................... | H04L 65/752 |
| | | | | 348/E7.083 |
| 2011/0069224 A1 * | 3/2011 | Gross | .................... | G06T 3/0012 |
| | | | | 348/E7.003 |
| 2013/0106988 A1 * | 5/2013 | Davis | .................... | H04L 65/403 |
| | | | | 348/E7.083 |
| 2014/0152760 A1 * | 6/2014 | Granstrom | ..... | H04N 21/234345 |
| | | | | 348/14.08 |
| 2017/0013236 A1 * | 1/2017 | Caldwell | ................ | H04N 7/142 |
| 2019/0124400 A1 * | 4/2019 | Wang | ................. | H04N 21/2187 |

(Continued)

*Primary Examiner* — Abderrahim Merouan
(74) *Attorney, Agent, or Firm* — Sterne, Kessler, Goldstein & Fox, P.L.L.C.

(57) ABSTRACT

In an aspect, a computer-implemented method allows for navigation in a three-dimensional (3D) virtual environment. In the method, data specifying a three-dimensional virtual space is received. A position and orientation in the three-dimensional virtual space is received. The position and orientation input by a first user and representing a first virtual camera used to render the three-dimensional virtual space to the first user. A video stream captured from a camera positioned to capture the first user is received. A second virtual camera is navigated according to an input of a second user.

18 Claims, 16 Drawing Sheets

(56) References Cited

U.S. PATENT DOCUMENTS

| | | | |
|---|---|---|---|
| 2019/0158889 A1* | 5/2019 | Xue | H04N 21/43 |
| 2019/0320144 A1* | 10/2019 | Tong | G06T 13/40 |
| 2022/0124283 A1* | 4/2022 | Krol | G06T 13/40 |
| 2022/0191405 A1* | 6/2022 | Lindmeier | H04N 23/45 |
| 2022/0326902 A1* | 10/2022 | Raucher | H04M 7/0027 |
| 2023/0139126 A1* | 5/2023 | Thiel | G06F 3/012 |
| | | | 345/419 |
| 2023/0321532 A1* | 10/2023 | Ben | A63F 13/352 |
| | | | 463/42 |

* cited by examiner

MULTIPLEXING VIDEO STREAMS IN AN AGGREGATE STREAM FOR A THREE-DIMENSIONAL VIRTUAL ENVIRONMENT

BACKGROUND

Technical Field

Aspects of the present disclosure relate to components, systems, and methods for navigating in a virtual environment.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user devices.

Recently, videoconferencing technology has gained importance. Especially since the COVID-19 pandemic, many workplaces, trade shows, meetings, conferences, schools, and places of worship are now taking place at least partially online. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. Where with physical meeting conferences people are able to gather in an area or a conference room to effectively interact with one another, virtual conferences often limit the ability to see or hear all participants. Even when all participants can be seen or heard in the virtual world, there may be a problem finding natural spacing or ordering amongst the participants.

Massively multiplayer online games (MMOG or MMO) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable in videoconferences. Some publications may describe having video placed on an avatar in a virtual world. However, these systems typically require specialized software and have other limitations that limit their usefulness. Improved methods are needed for videoconferencing.

SUMMARY

In a first embodiment, a method for transferring video for generating avatars in a three-dimensional virtual environment is provided. In the method, a first video stream captured from a first camera on a first device of a first user and a second video stream captured from a second camera on a second device of a second user are received. The first and second cameras are positioned to capture photographic images of the first and second user respectively. A third video stream incorporating the first and second video streams is generated and transmitted to a third device of a third user. The third device is configured to decode the first and second video streams from the third video stream. It is configured to generate, based on the respective first and second video streams, avatars in the three-dimensional virtual environment at a position controlled by the respective user. Finally the third device is configured to render, for display to the third user and from a perspective of a virtual camera controlled by the third user, the three-dimensional virtual environment including the avatars.

In a second embodiment, a method generating a three-dimensional virtual environment using a multiplexed video stream. In the method, an aggregated video stream is received. The aggregated video stream incorporates a first video stream captured from a first camera on a first device of a first user and a second video stream captured from a second camera on a second device of a second user. The first and second cameras are positioned to capture photographic images of the first and second user. The first and second video streams are decoded from the aggregated video stream. Based on the first video stream, a first avatar in the three-dimensional virtual environment is generated at a first position of the first avatar controlled by the first user. Based on the second video stream, a second avatar in the three-dimensional virtual environment is generated at a second position of the second avatar controlled by the second user. Finally, the three-dimensional virtual environment including the first and second avatars is rendered for display to a third user and from a perspective of a virtual camera controlled by the third user.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Video Conference with Avatars in a Virtual Environment

Figure 1:
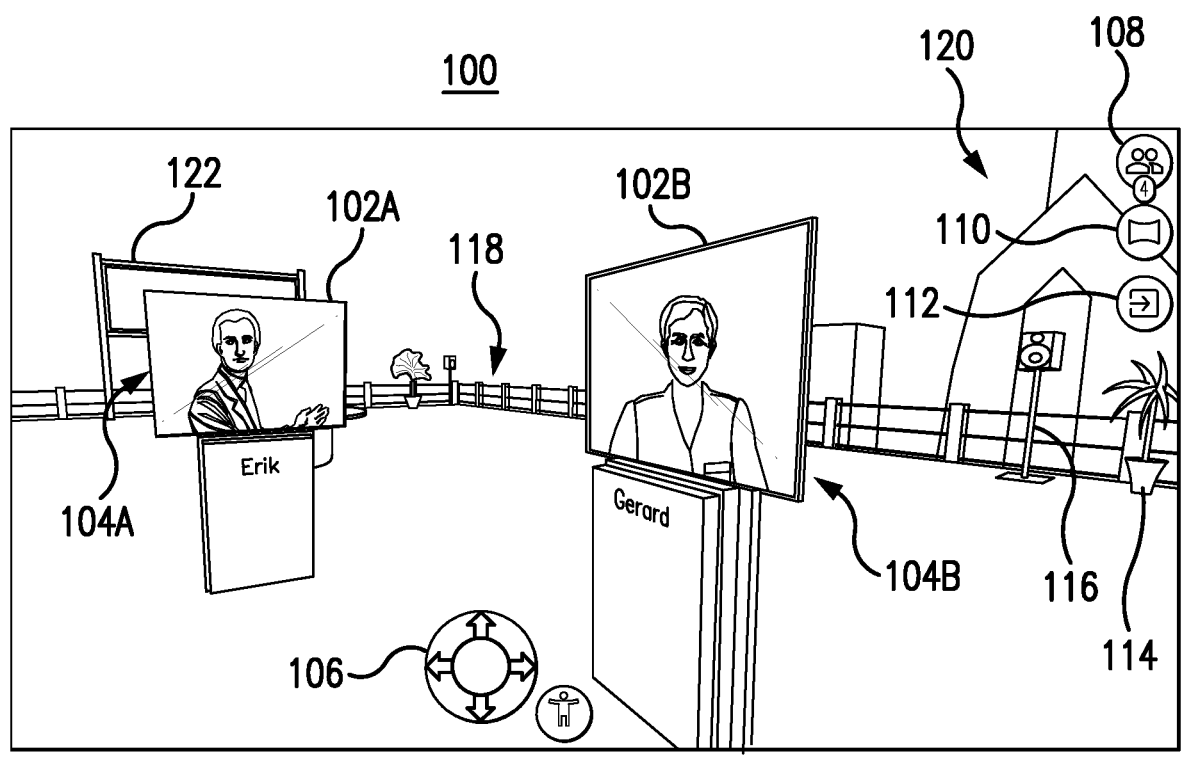
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an aspect, different inputs may change the virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and 102B, which represent two different participants to the videoconference. Avatars 102A and 102B, respectively, have texture mapped video streams 104A and 104B from devices of the first and second participant. A texture map is an image applied (mapped) to the surface of a shape or polygon. Here, the images are respective frames of the video. The camera devices capturing video streams 104A and 104B are positioned to capture faces of the respective participants. In this way, the avatars have texture mapped thereon, moving images of faces as participants in the meeting talk and listen.

Similar to how the virtual camera is controlled by the user viewing interface 100, the location and orientation of avatars 102A and 102B are controlled by the respective participants that they represent. Avatars 102A and 102B are three-dimensional models represented by a mesh. Each avatar 102A and 102B may have the participant's name underneath the avatar.

The respective avatars 102A and 102B are controlled by the various users. They each may be positioned at a point corresponding to where their own virtual cameras are located within the virtual environment. Just as the user viewing interface 100 can move around the virtual camera, the various users can move around their respective avatars 102A and 102B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as with model 118, these models can be represented using any mathematical procedure to represent a geometric surface in three-dimensional space. These models may be separate from model 118 or combined into a single representation of the virtual environment.

Decorative models, such as model 114, serve to enhance the realism and increase the aesthetic appeal of the arena. Speaker model 116 may virtually emit sound, such as presentation and background music. Presentation screen model 122 can serve to provide an outlet to present a presentation. Video of the presenter or a presentation screen share may be texture mapped onto presentation screen model 122.

Button 108 may provide the user with a list of participants. In one example, after a user selects button 108, the user can chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60° and 110°, which is commensurate with a wide-angle lens and human vision. However, selecting button 110 may cause the virtual camera to increase the field of view to exceed 170°, commensurate with a fisheye lens. This may enable a user to have broader peripheral awareness of their surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump or do other things which change the position or orientation of the avatar. A virtual camera shows the user the virtual 3D environment and the other avatars. The avatars of the other users have as an integral part a virtual display, which shows the webcam image of the user.

By giving users a sense of space and allowing users to see each other's faces, aspects provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective when a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, and special ops), and making reservations (e.g., for a certain holiday, home/car/etc.)

Figure 2:
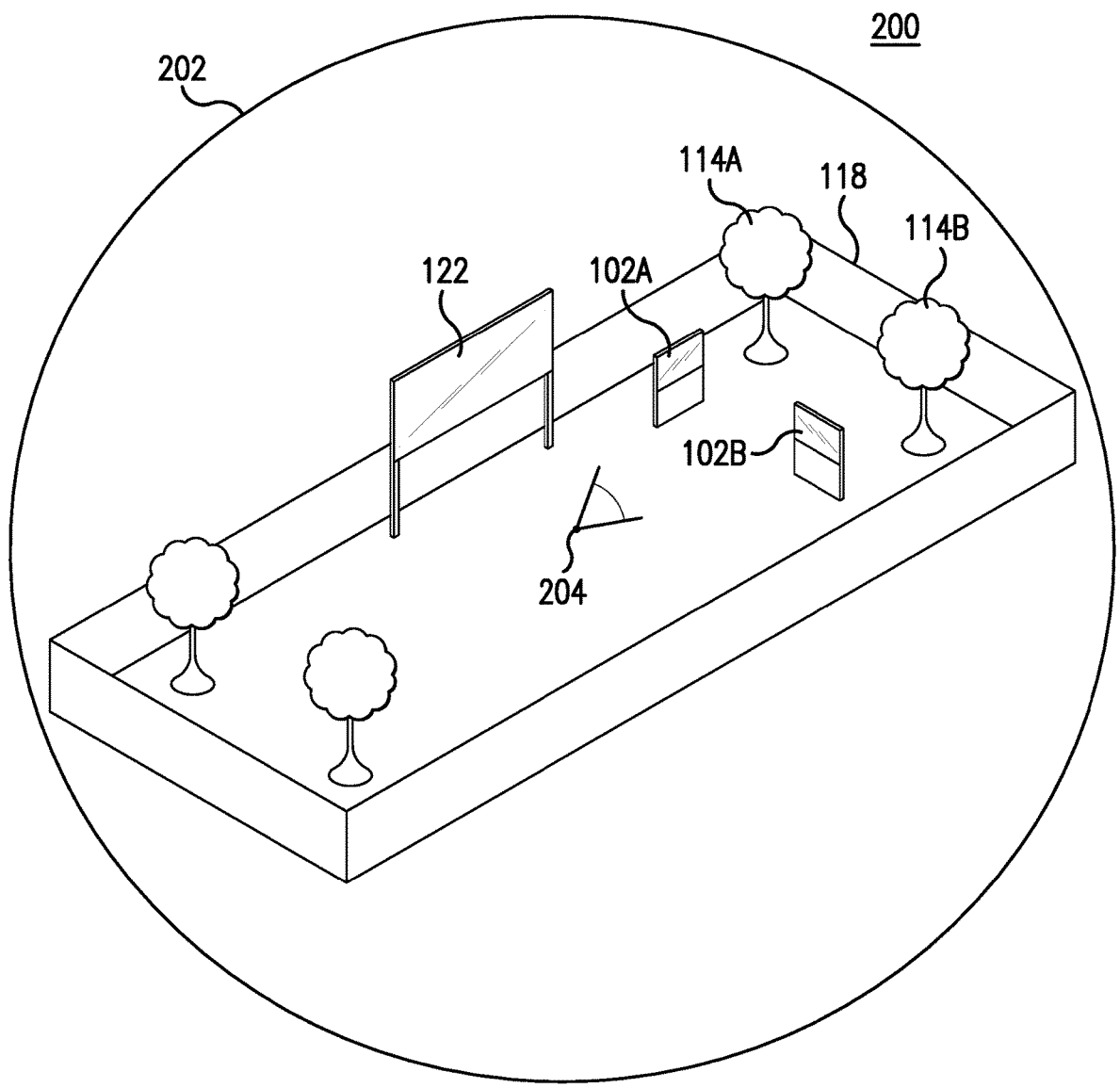
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114A and B and 122. Also as illustrated in FIG. 1, diagram 200 includes avatars 102A and 102B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of sphere 202 may be used to texture map the background image. In various alternative aspects, the shape may be a cylinder, cube, rectangular prism, or any other three-dimensional geometric shape.

When a user is speaking, the corresponding user's avatar may have some sort of visual indication indicating that they are speaking. For example, their avatar may be outlined a different color or may light up or be somehow otherwise bolded or emphasized. In this way, other users can tell they are speaking and may be easier to identify which users are currently talking. This may be particularly advantageous in large conferences where the participants may not recognize each other's voices.

Figure 3:
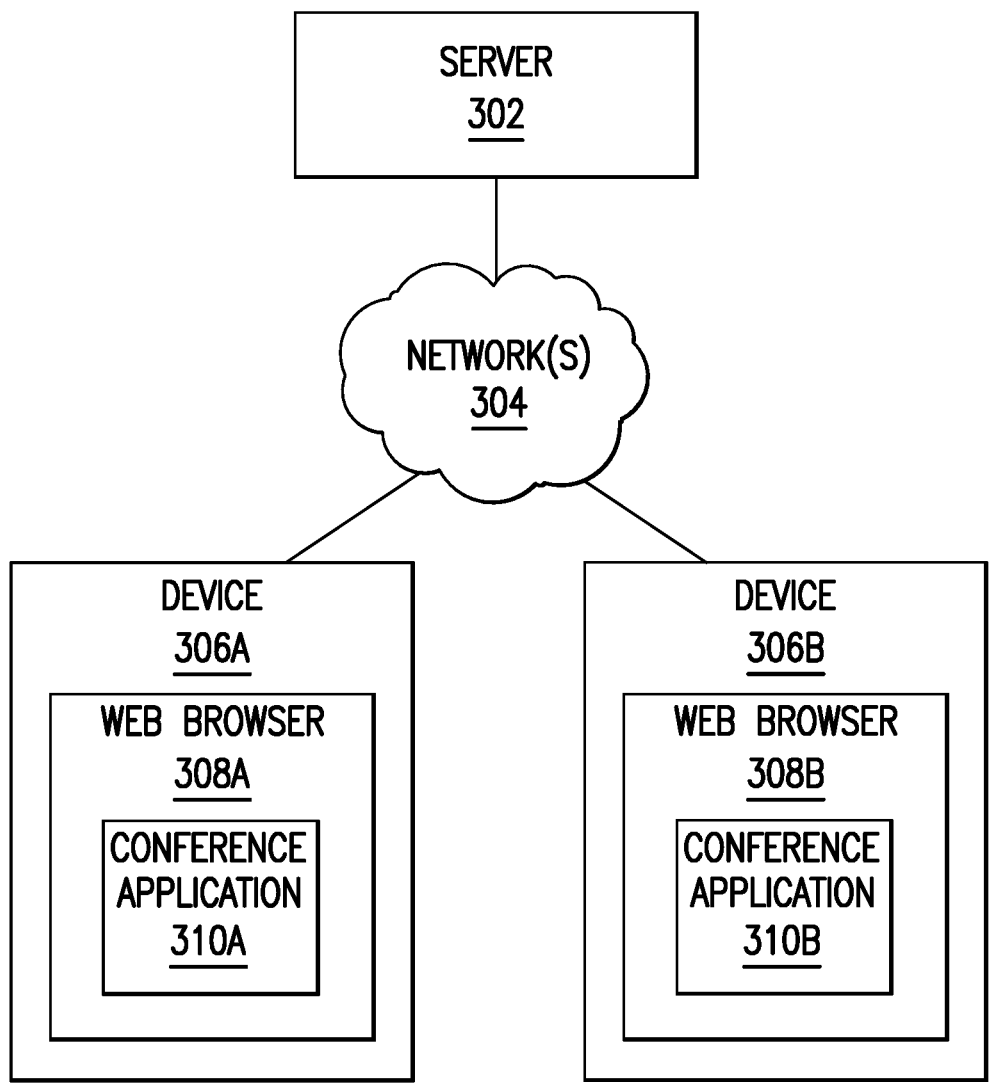
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and 306B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and orientation in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative aspect, communication between devices 306A-B happens not through server 302 but on a peer-to-peer basis. In that aspect, one or more of the data describing the respective participants' location and orientation, the notifications regarding new and existing participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, a tablet computer, or a wearable computer (such as a smartwatch or an augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display device 306A-B shown as client/counterpart conference application 310A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an aspect, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins is also possible.

Conference application 310A-B receives the data from server 302 describing position and orientation of other avatars and three-dimensional modeling information describing the virtual environment. In addition, conference application 310A-B receives video and audio streams of other conference participants from server 302.

Conference application 310A-B renders three-dimensional modeling data, including data describing the three-dimensional environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. As will be described below, in certain embodiments, only some of the other users, like those in proximity to the user, receive the position information and video stream, or even notification that the new user has entered. The video stream of a user is placed on the avatar that was created for that user. The audio stream is played back as coming from the position of the avatar. As the distance of the avatar increases, a volume of the audio stream may be decreased. At some point, a distance between a virtual camera and an avatar may be great enough so that the audio stream is turned off entirely.

Figure 4A:
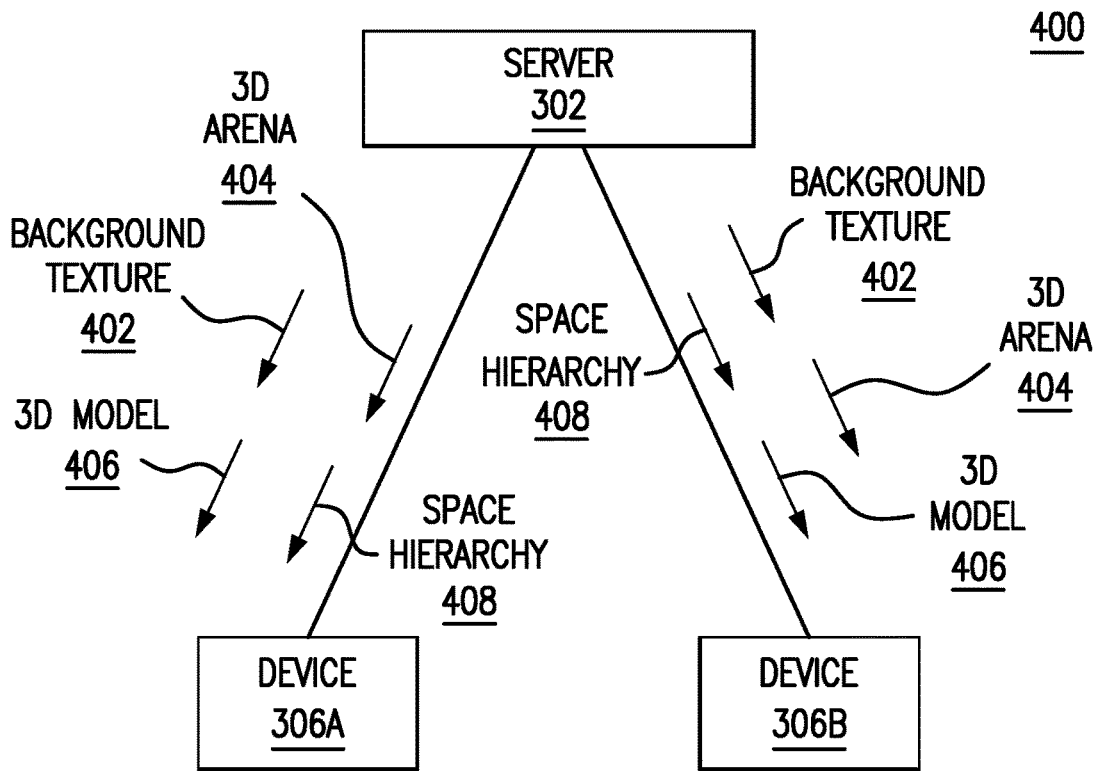
FIGS. 4A-4C illustrate how data is transferred between various components of the system in FIG. 3 to provide videoconferencing.
Figure 4B:
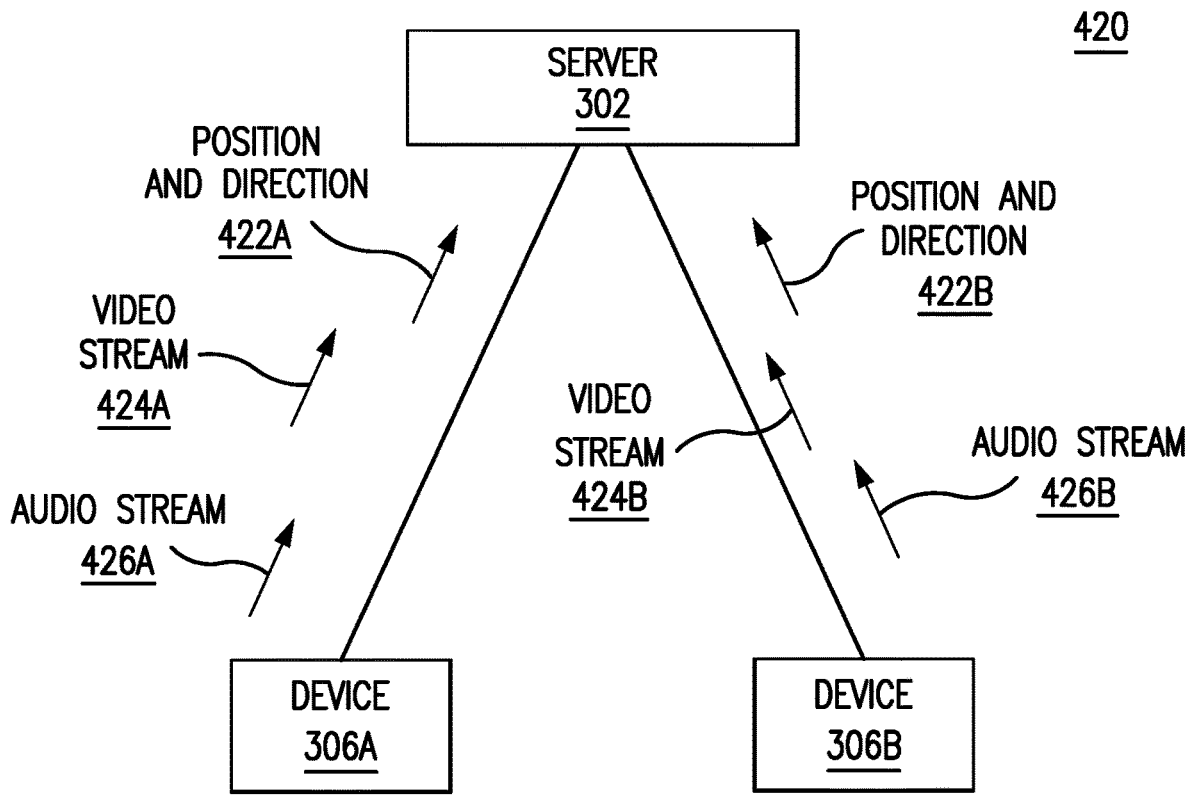
Figure 4C:
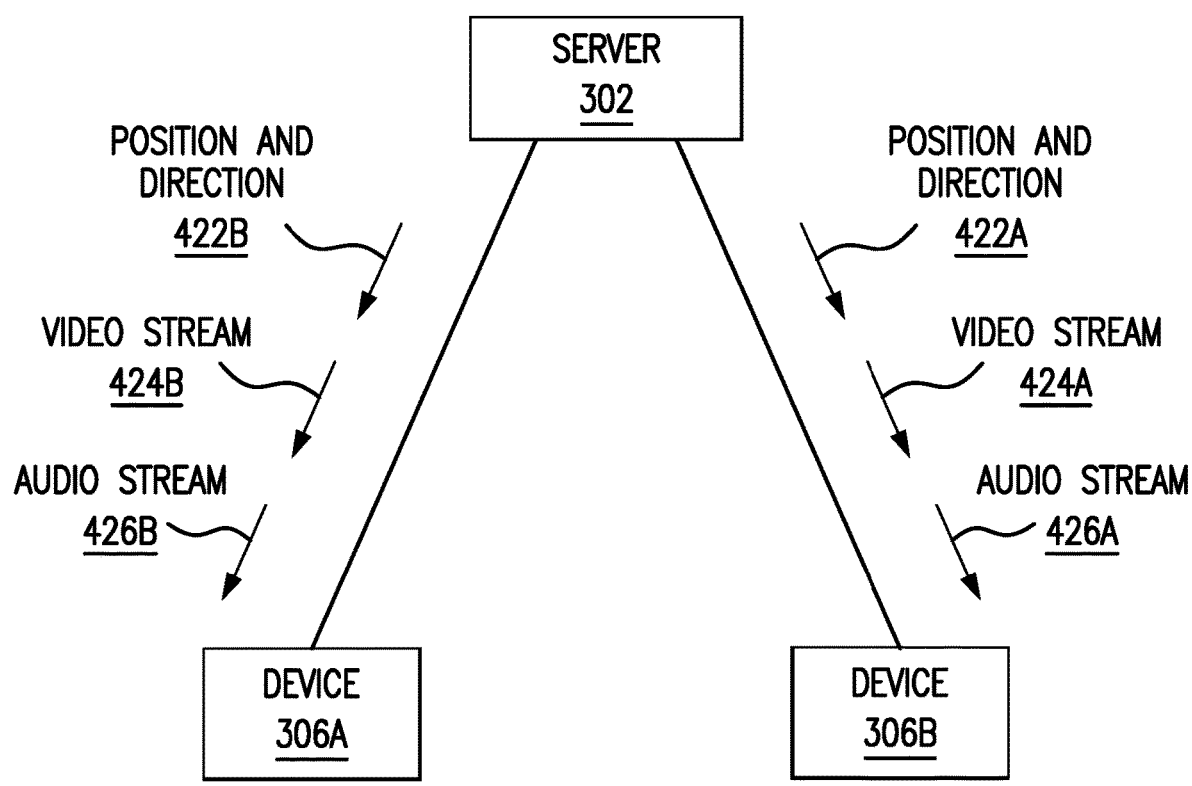

FIGS. 4A-4C illustrate how data is transferred between various components of the system in FIG. 3 to provide videoconferencing. Like FIG. 3, each of FIGS. 4A-4C depict the connection between server 302 and devices 306A and 306B. In particular, FIGS. 4A-4C illustrate example data flows between those devices.

FIG. 4A illustrates a diagram 400 illustrating how server 302 transmits data describing the virtual environment to devices 306A and 306B. In particular, both devices 306A and 306B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas or zones where participants to the virtual conference can have private conversations or side conversations.

Three-dimensional model 406 is any other three-dimensional modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and 306B, and FIG. 4C illustrates a diagram 460 showing how server 302 transmits the information to respective devices 306B and 306A. In particular, device 306A transmits position and orientation 422A, video stream 424A, and audio stream 426A to server 302, which transmits position and orientation 422A, video stream 424A, and audio stream 426A to device 306B. And device 306B transmits position and orientation 422B, video stream 424B, and audio stream 426B to server 302, which transmits position and orientation 422B, video stream 424B, and audio stream 426B to device 306A.

Position and orientation 422A-B describe the position and orientation of the virtual camera for the user of device 306A. As described above, the position may be a coordinate in three-dimensional space (e.g., x, y, z coordinate) and the orientation may be a direction in three-dimensional space (e.g., pan, tilt, roll). In some aspects, the user may be unable to control the virtual camera's roll, so the orientation may only specify pan and tilt angles. Similarly, in some aspects, the user may be unable to change the avatar's z coordinate (as the avatar is bounded by virtual gravity), so the z coordinate may be unnecessary. In this way, position and orientation 422A-B each may include at least a coordinate on a horizontal plane in the three-dimensional virtual space and a pan and tilt value. Alternatively or additionally, the user may be able to "jump" it's avatar, so the Z position may be specified only by an indication of whether the user is jumping their avatar.

In different examples, position and orientation 422A-B may be transmitted and received using HTTP request responses or using socket messaging. A single reliable Transmission Control Protocol (TCP) websocket connection. In another example, an unreliable but lightweight transport protocol such as User Datagram Protocol (UDP) may be used.

Video stream 424A-B is video data captured from a camera of the respective devices 306A and 306B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or Vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and 306B download and run web applications, as conference applications 310A and 310B, and conference applications 310A and 310B may be implemented in JavaScript. Conference applications 310A and 310B may use WebRTC to receive and transmit video stream 424A-B and audio stream 426A-B by making API calls from its JavaScript. The WebRTC negotiation messages may be sent over TCP while the streams themselves may be sent over UDP.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A. As will be described below, in certain embodiments, a user may be considered departed when it leaves an area or is no longer in proximity to another user. When the user leaves the proximity, the other user will stop receiving the position information and video stream.

As described above, conference applications 310A and 310B may periodically or intermittently re-render the virtual space based on new information from respective video streams 424A and 424B, position and orientation 422A and 422B, and new information relating to the three-dimensional environment. For simplicity, each of these updates are now described from the perspective of device 306A. However, a skilled artisan would understand that device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and orientation 422B, device 306A generates the avatar corresponding to device 306B positioned at the new position and oriented at the new direction. The generated avatar is re-rendered within the three-dimensional virtual space and presented to the user of device 306A.

In some aspects, server 302 may send updated model information describing the three-dimensional virtual environment. For example, server 302 may send updated information for the three-dimensional arena 404, background texture 402, space hierarchy 408 and any other three-dimensional modeling information 406. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-4C is illustrated with two devices for simplicity, a skilled artisan would understand that the techniques described herein can be extended to any number of devices. Also, while FIG. 3 in FIGS. 4A-4C illustrates a single server 302, a skilled artisan would understand that the functionality of server 302 can be spread out among a plurality of computing devices. In an aspect, the data transferred in FIG. 4A may come from one network address for server 302, while the data transferred in FIGS. 4B-4C can be transferred to/from another network address for server 302.

Allocating a Stream Budget Based on Capacity

Figure 5:
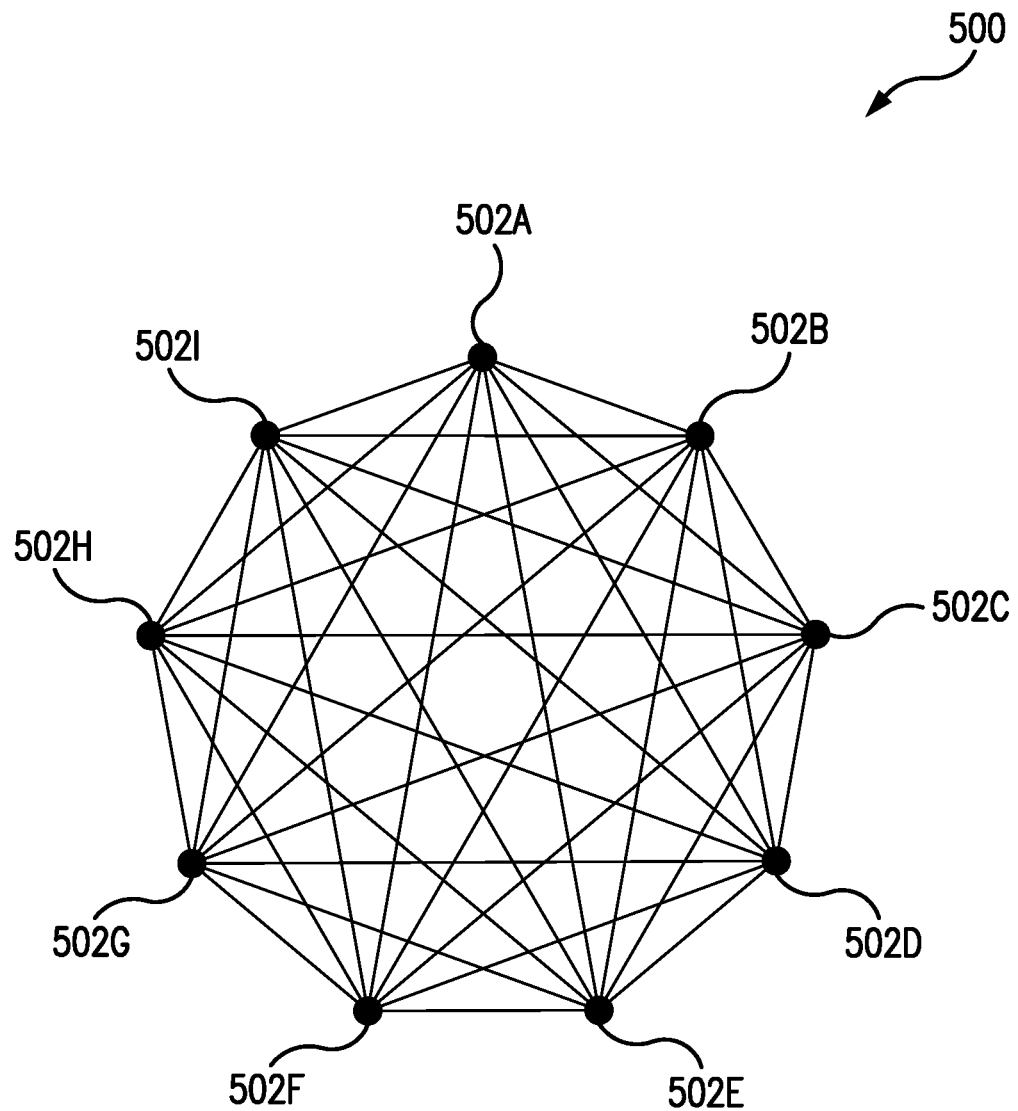
FIG. 5 is a diagram illustrating connections between videoconferencing participants.

FIG. 5 is a diagram 500 illustrating connections between videoconferencing participants. Many users can join the same three-dimensional virtual environment. In diagram 500, these users are illustrated as users 502A-I. As described above, when users are present in the three-dimensional virtual environment, they can see and interact with each other in real-time. For example, they can see each other's avatars smoothly moving about the space. They can view and hear the other users' audio and video streams. In the case where a user is sharing a presentation, they can see and hear the user's shared screen, which can include audio and video streams captured from the user's desktop.

As the number of users in a space increases, the number of possible interactions or connections between users increases faster than linearly. This may roughly follow a quadratic curve; that is, if there are N users in a space, the number of connections between them scales proportional to $N*N=N^2$. These connections are illustrated in diagram 500 has the lines connecting 502A-I.

Each connection between users at least includes three dimensional position information, which can be updated many times per second (e.g., up to 30 times per second) and audio and video data (e.g., at 25 frames per second). Thus, a single connection between any of the users potentially consumes both a lot of network bandwidth and a lot of processing (CPU) resources.

Returning to the system in FIGS. 4A-4C, devices 306A-B send their position, video, and audio streams to server 302 and server 302 routes and forwards the data to all other devices 306A-B authorized to consume it. This may provide benefits over allowing devices 306A-B to broadcast information directly. These benefits may include improved scalability, efficiency, security and performance. For example, having devices 306A-B communicate directly with each other may create issues with firewalls, network address translations (NATs) and a user's hardware exhausting the upload bandwidth of their local network.

However, server 302 may have a finite amount of both bandwidth and processing (CPU) power. Thus, server 302 can become a limiting factor when attempting to scale up the number of users. At least in part to deal with this, embodiments limit and prioritize the number of allowed connections between users as described with respect to FIGS. 6-7.

Figure 6:
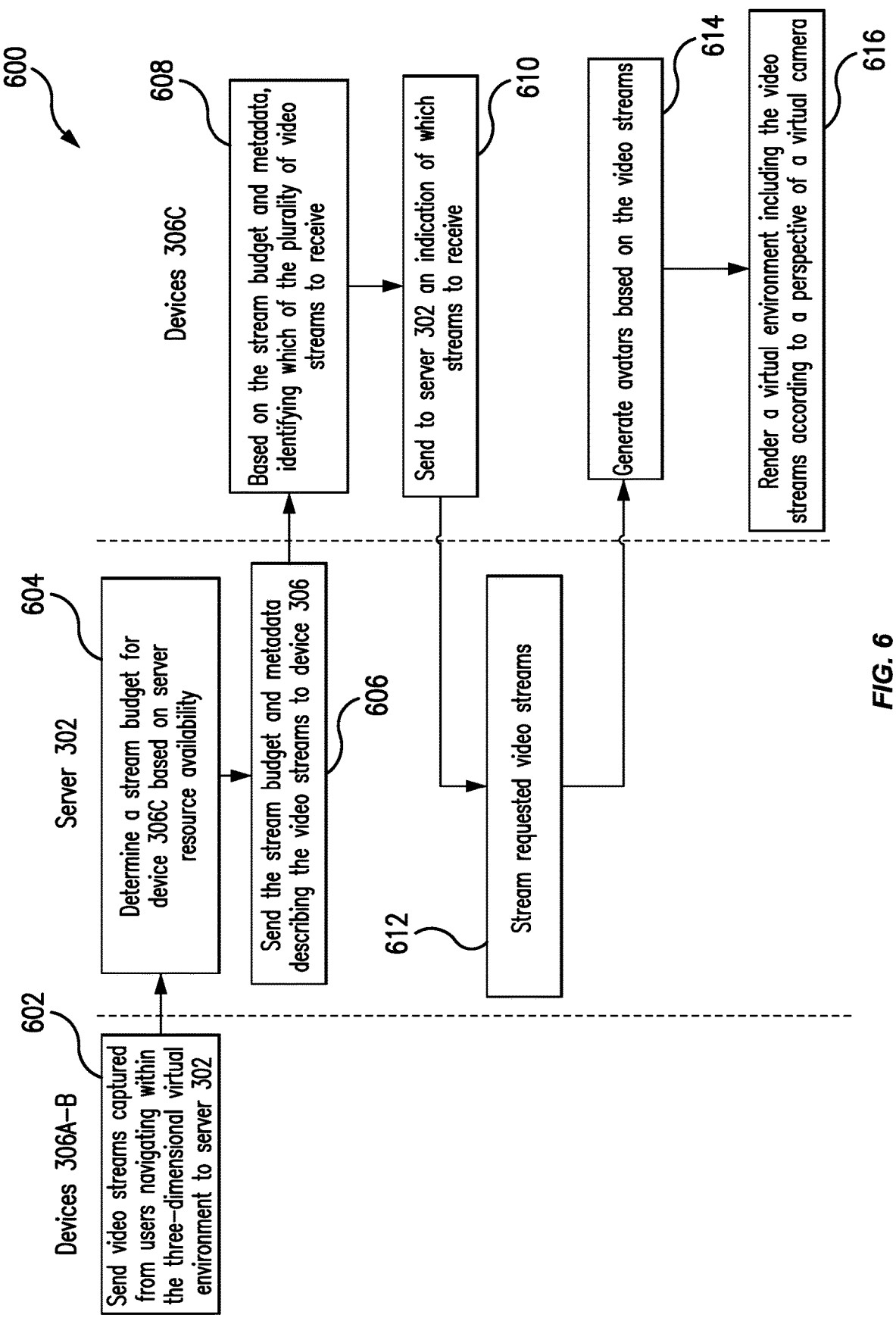
FIG. 6 is a flowchart illustrating allocating a stream budget for a client.

FIG. 6 is a flowchart illustrating a method 600 for allocating a stream budget for a client. The client is illustrated in FIG. 6 as device 306C.

Method 600 starts at step 602. At step 602, various devices of other participants to the videoconference, illustrated in devices 306A-B, each send to server 302 a video stream captured from a user navigating within the three-dimensional virtual environment. As described above, each video stream may be captured from a camera on a device positioned to capture video of the user's face. Server 302 receives the video streams from devices 306A-B.

At step 604, server 302 determines a stream budget for device 306C based on resource availability at server 302. The stream budget may be a maximum number of video streams to send to a client. The server resource availability may correlate to the CPU availability of server 302 and the bandwidth available to server 302. Server 302 may monitor and adjust its availability using metrics. For example, if increased latency, increased packet loss, or decreased bandwidth conditions are detected, total stream budget available to all the client devices may be lowered until conditions improve.

Server 302 may globally set client stream budgets to account for server resource scarcity and to account for when server capacity limits are reached. For example, if a global maximum number of streams is calculated for a server, as the number of connected clients increases the average per-client stream budget (as a proportion of the total) will necessarily decrease. As availability capacity changes, server 302 may adjust a client stream budget accordingly.

At 606, server 302 sends the stream budget determined at 604 and metadata describing the video streams to device 306C. The metadata may indicate which video streams are available to device 306C. The metadata may also include information about the video streams, such as quality of the streams. Device 360A-B receives the stream budget and metadata.

At 608, device 306C identifies, based on the received stream budget and metadata, which of the plurality of video streams to receive. This identification may involve determining a number of streams device 306C is able to handle and a selection of which streams from those identified in the metadata to receive. To determine a number of streams is able to handle, device 306C may also make a determination based on its available CPU and bandwidth capacity. As with the determination made at server 302, device 306C may adjust its own stream budget based on its local conditions. For example, if increased latency, increased packet loss, or decreased bandwidth conditions are detected, the budget can be lowered until conditions improve. If the number of streams it is able to handle based on his own capacity requirements is below the stream budget received from server 302, device 306C may only request number of streams device 306C is able to handle. On the other hand, if the stream budget received from the server is below the stream budget that device 306C determines based on its on resource availability, device 306C will only request the number of streams set in the stream budget from server 302.

Device 306C may select which streams to request at least in part based on any combination of the following criteria:

Priority—Streams may be assigned a priority value. The priority value may be based on a subscription level for a user of device 306A-B that generated the stream. Higher priority streams may be preferred.

Correlation—Paired audio and video streams are preferred to independent audio or video streams. For example, if audio is not transmitted, the video stream may be less likely to be transmitted to device 306C. In another example, if the audio is not transmitted because the distance between the avatars is too great or they are in different spaces, such as defined in space hierarchy 408 in FIG. 4A, the video stream may be less likely to be transmitted.

Locality—Video or audio streams in the same zone in space hierarchy 408 in FIG. 4A may be preferred. At a certain distance, all peer streams are ineligible to consume (although this may not be true for some "global" streams).

Visibility—Video or audio streams belonging to avatars visible to the user may be preferred. An avatar may be visible when it is within the user's field of view and/or it is un-obstructed by other models within the three-dimensional virtual environment. M.

Distance—Video or audio streams originating closer to the client may be preferred.

Age—Video or audio streams that are already being consumed or have been consumed for a longer period of time are preferred to new streams or younger streams. In this way, streams for users already in the environment may tend to have precedence over streams for a user just entering the environment.

Quality—Streams having higher quality are preferred over those with lower quality. Quality can be assessed using a number of metrics, including bandwidth, video size, framerate, codec, compression rate, latency, jitter, and packet loss.

Presenting—Streams belonging to users currently presenting, e.g., sharing a presentation stream such as described above with respect to presentation screen model 122, may be given a higher priority to those that are not presenting.

Engagement—A measure of how likely it is two users are interacting with each other may be determined. The measure may be determined whether the users are facing each other, whether the user are close enough to interact with one another, and whether they are sharing other user's streams. In this way, a measure of likely engagement may be determined. Streams belonging to users with a greater engagement measure may be preferred over streams with a lesser engagement measure.

Device 306C may select which streams to request based on the criteria using weighting and scoring techniques. In an example, each of the above techniques may be given a weight used to determine a score. The streams may be ranked and sorted based on the score.

In this way, device 306C determines which streams it would like to receive. In a further embodiment, these categories may be used to select not just whether or not device 306C would like to receive the streams, but at what quality level the streams should be transmitted to device 306C. For example, a resolution, bit rate, or frame rate may be selected for a stream based on the criteria and/or sorting described above.

In a still further embodiment, the criteria may have a predictive aspect to it. For example, an algorithm may look at how the criteria are likely to change in the future. For example, if a new user is only momentarily close to the user of device 306C, device 306C should not shut down an existing stream for the new user.

At 610, device 306C sends to server 302 an indication of which streams to receive. Server 302 receives the indication and streams the requested video streams to device 306C at 612. The streams may be sent as individual video streams using, for example, WebRTC as described above. Alternatively, they may be aggregated as will be described below with respect to FIG. 8.

Once device 306C receives the request of video streams, device 306C generates avatars based on the video streams at step 614 and renders a virtual environment including the video streams according to a virtual camera controlled by the user device 306C at step 616. When a video stream for a user is not received, an avatar for the user may still be rendered without the video. For example, the avatar may simply have the user's default profile image or may be kept abstract.

Additionally or alternatively, the budgeting method described with respect to FIG. 6 may be not just for video streams but for audio streams. The server may determine a budget of audio streams that a client is able to receive. The server may send the budget along with metadata describing the audio streams to the client. Then, the client may select which streams, within that budget, to subscribe to.

Figure 7:
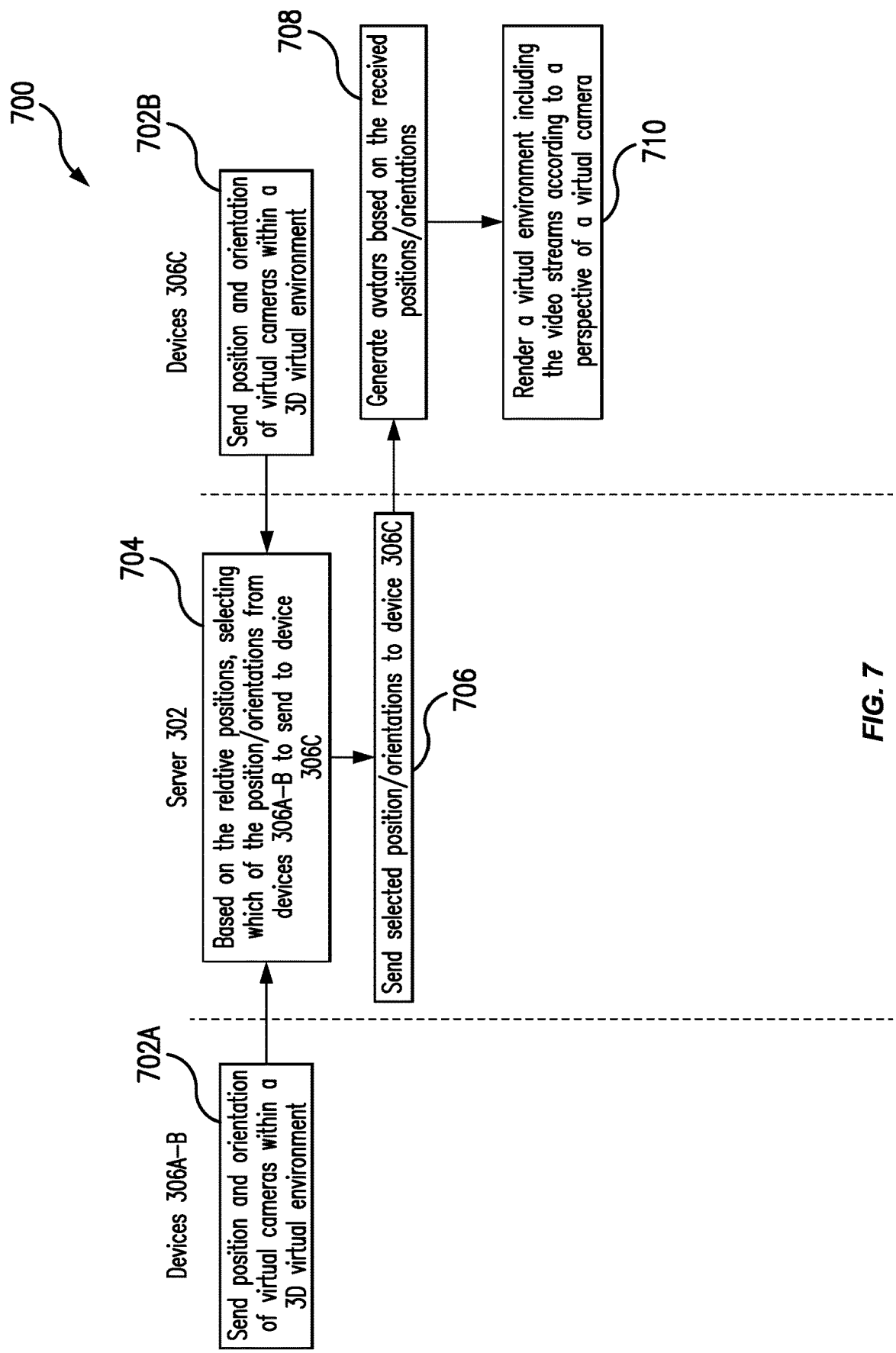
FIG. 7 is a diagram illustrating how position and orientation information can be distributed selectively across users in a three-dimensional virtual environment.

FIG. 7 is a diagram illustrating a method 700 enabling position and orientation information to be distributed selectively across users in a three-dimensional virtual environment.

At step 702A-B, clients with users in the three-dimensional virtual environments send position and orientation of their respective position within the three-dimensional virtual environment. This position and orientation is the position and orientation of the virtual camera that the respective devices use to render the three-dimensional virtual environment. In diagram 700, devices 306A-B send their position and orientation at step 702A and device 306C sends its position and orientation at step 702B. The position or orientation data is received at server 302. A skilled artisan would recognize that devices 306A-B and 306C may be equivalent for receiving position/orientation and generating avatars. Method 700 would be applied similarly to any connected device.

At 704, server 302 selects, based on the relative positions, which of the positions/orientations from device 306A-B to send to device 306C. This peer discovery allows device 306C only track other users who are located nearby within the three-dimensional virtual environment, not necessarily every user in the environment.

Server 302 may also select which positions/orientations from devices 306A-B to send to device 306C based on, not just how far apart they are, but also when the last time the position/orientation of the respective devices 306A-B was sent to device 306C. In this way, a location frequency, e.g., how often location information is exchanged between peers, may vary based on distance. Peers that are "close" to a client should receive and send location updates frequently to maintain an accurate and smooth visual representation of their position and orientation. Peers that are "far" from a client should receive and send location updates less frequently because they may not appear to move very much when rendered on a screen and because the user is likely not paying attention to or concerned with peers that are far away. To smooth the apparent motion of far peers between updates, device 306C can interpolate the transition of avatars corresponding to devices 306A-B.

At 706, server 302 sends the selected positions/orientations to device 306C. Once device 306C receives the selected positions/orientations, at step 708 device 306C generates avatars based on the video streams positioned at the selected positions/orientations and renders a virtual environment including the video streams according to a virtual camera controlled by the user device 306C.

In this way, embodiments can segregate a portion of the virtual environment that is simulated on the client device from a portion of the virtual environment that the client device need not be simulated or need only be partially simulated.

The methods described in FIGS. 6 and 7 may not just happen once. Instead, they may occur repeatedly periodically or when users are moving around, new people are joining or leaving, streams are being shared, and users are muting or unmuting.

In some embodiments, depending on the criteria described above, a client may not entirely unsubscribe to a stream, but merely pause receipt of it. In that embodiment, the client may no longer be receiving the video, but the client still has the ability to resume receipt of the video without having to negotiate a new connection.

Merging Video Streams into an Aggregate Stream

Figure 8:
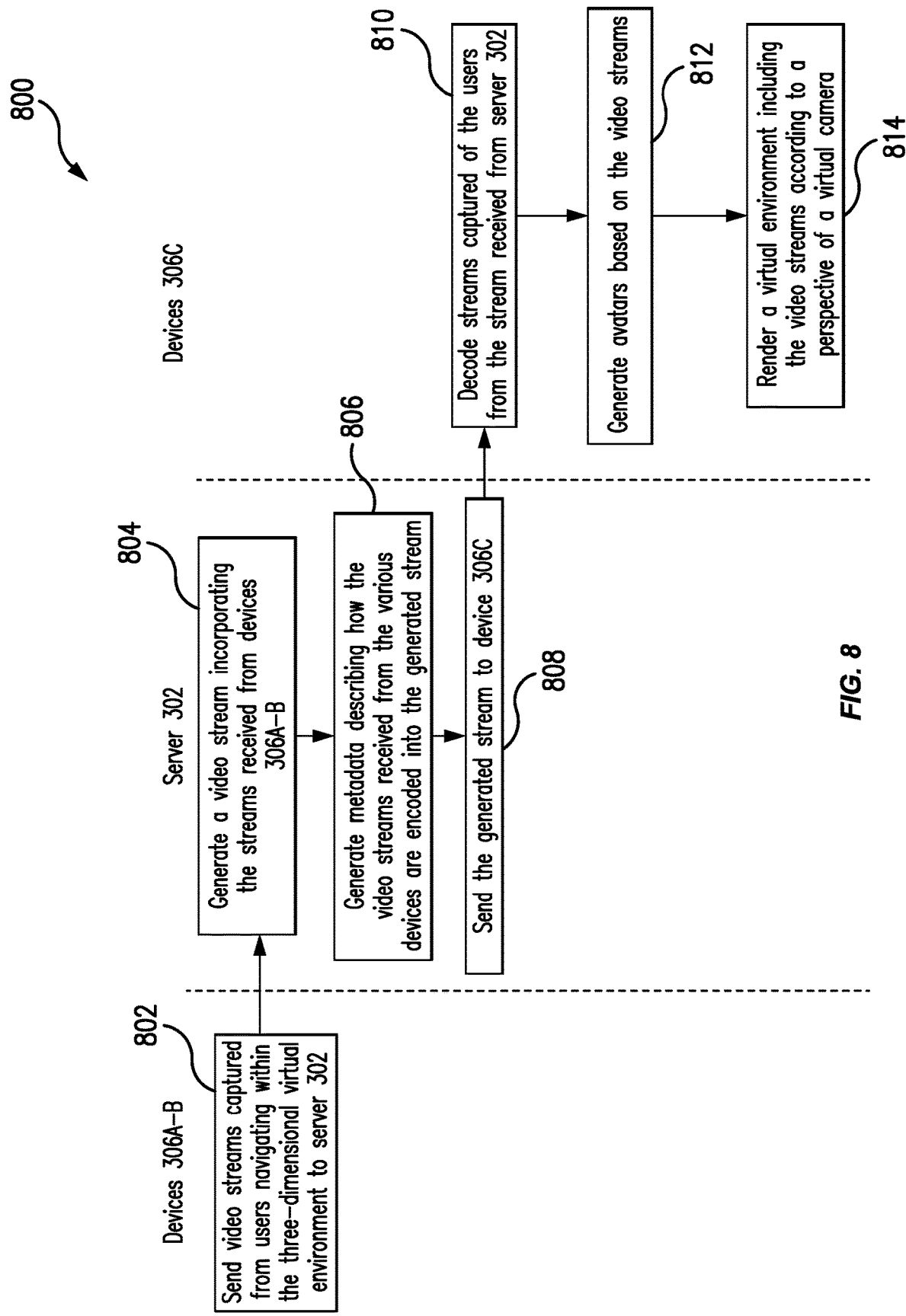
FIG. 8 is a flowchart illustrating merging video streams into an aggregate video stream sent to a client.

FIG. 8 is a flowchart illustrating a method 800 for merging video streams into an aggregate video stream sent to a client. The client is illustrated in FIG. 6 as device 306C.

At 802, various devices of other participants to the videoconference, illustrated in devices 306A-B, each send to server 302 a video stream captured from a user participating in the three-dimensional virtual environment. As described above, each video stream may be captured from a camera on a device position to capture video of the user's face. Server 302 receives the video streams from devices 306A-B.

At 804, server 302 generates a video stream incorporating the screens received from devices 306A-B. In an embodiment, multiple client streams are visually multiplexed on the server into a single stream. The multiple client streams may be multiplexed by arranging frames from the respective streams in a grid pattern in a newly generated stream. This is illustrated for example in FIG. 9A.

Figure 9A:
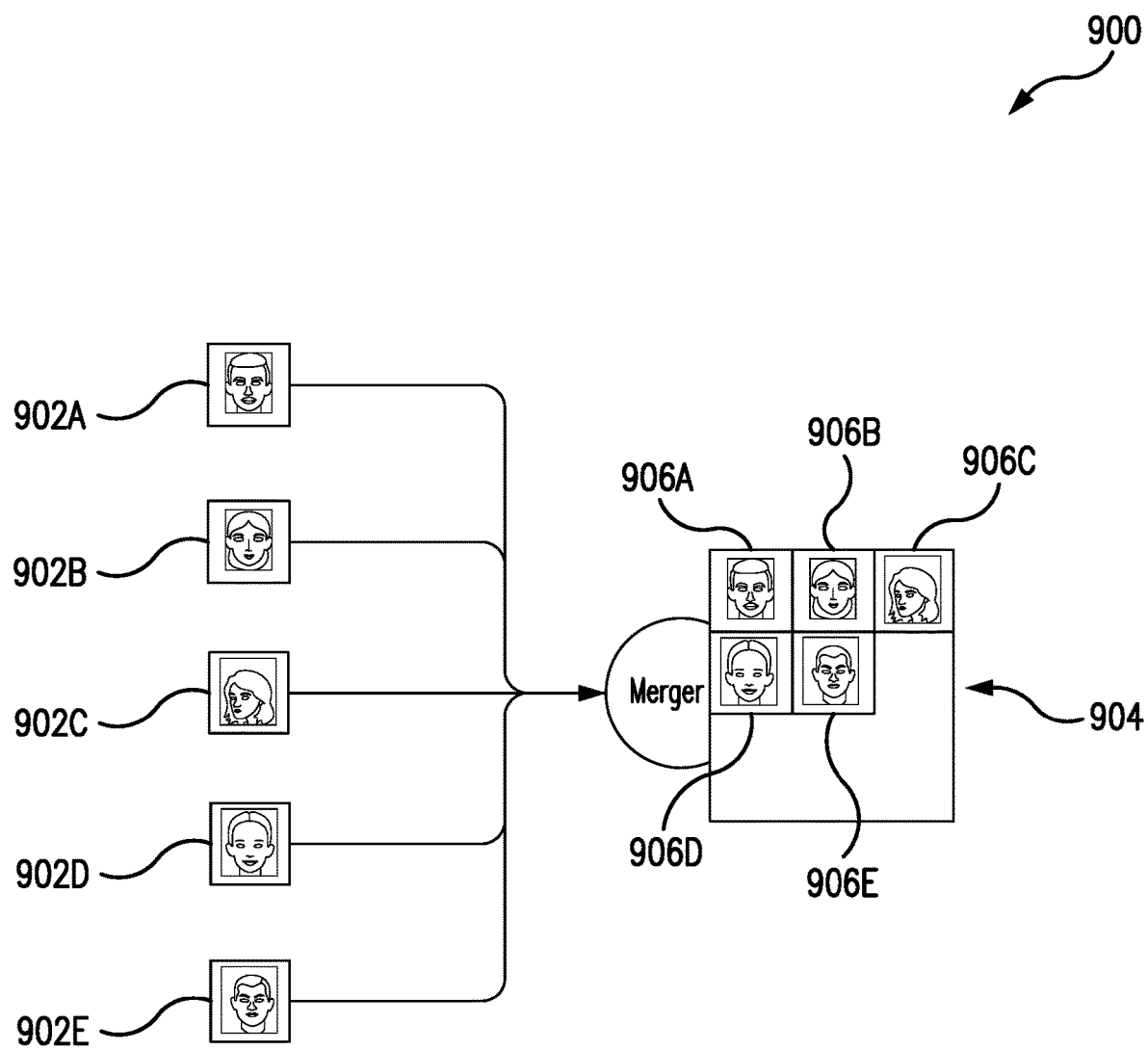
FIG. 9A is a diagram illustrating how multiple builder video streams are merged into a single video stream.

FIG. 9A is a diagram 900 illustrating how multiple video streams are merged into a single video stream. Diagram 900 illustrates video streams 902A-E. These video streams may be all the video streams for avatars in the same three-dimensional environment as the user of device 306C.

In other examples, video streams 902A-E may be selected from the video streams for avatars in the same three-dimensional environment as the user of device 306C. Video streams 902A-E may be selected based on a position of the user's virtual camera within the three-dimensional environment. For example, if the user of device 306C is located within a particular volume zone (as described above with respect to space hierarchy 408 in FIG. 4A), video streams 902A-E may represent video streams for users outside of that particular volume zone. Video streams 902A-E may represent video streams for users outside of that particular volume zone and may represent all the video streams for users within or expected to be within the user of device 306C's field of view that are outside of the user's volume zone. When one of video streams 902A-E is adequately close (such as within the same zone), it is removed from aggregate video stream 904 and instead sent separately as described above.

As illustrated in diagram 900, video streams 902A-E are merged into an aggregate video stream 904. For each of the video streams 902A-E, an area of frames from the aggregate video stream 904 must be determined. In one possible embodiment, the area may be determined by simply dividing the available area from the frames of aggregate video stream 904 by the number of video streams 902A-E. In other embodiments, various templates may be used. And one of several templates may be selected based at least in part on the number of video streams 902A-E to include in aggregate video stream 904.

For each respective frame of aggregate video stream 904, a current frame from the video streams 902A-E is identified. The current frame is mapped to the respective areas identified for video streams 902A-E. To map the frame to an area, the frame may be resized. The resizing may involve changing a resolution of the respective frames. The mapping may also involve cropping the video streams 902A-E to the areas and even to the shape of the avatars they will ultimately be texture mapped to.

In one embodiment, the area that each video streams 902A-E occupies within aggregate video stream 904 is equal. In a further embodiment, the area that each video streams 902A-E may not be equal. This is illustrated with respect to FIGS. 10A-B.

Figure 10A:
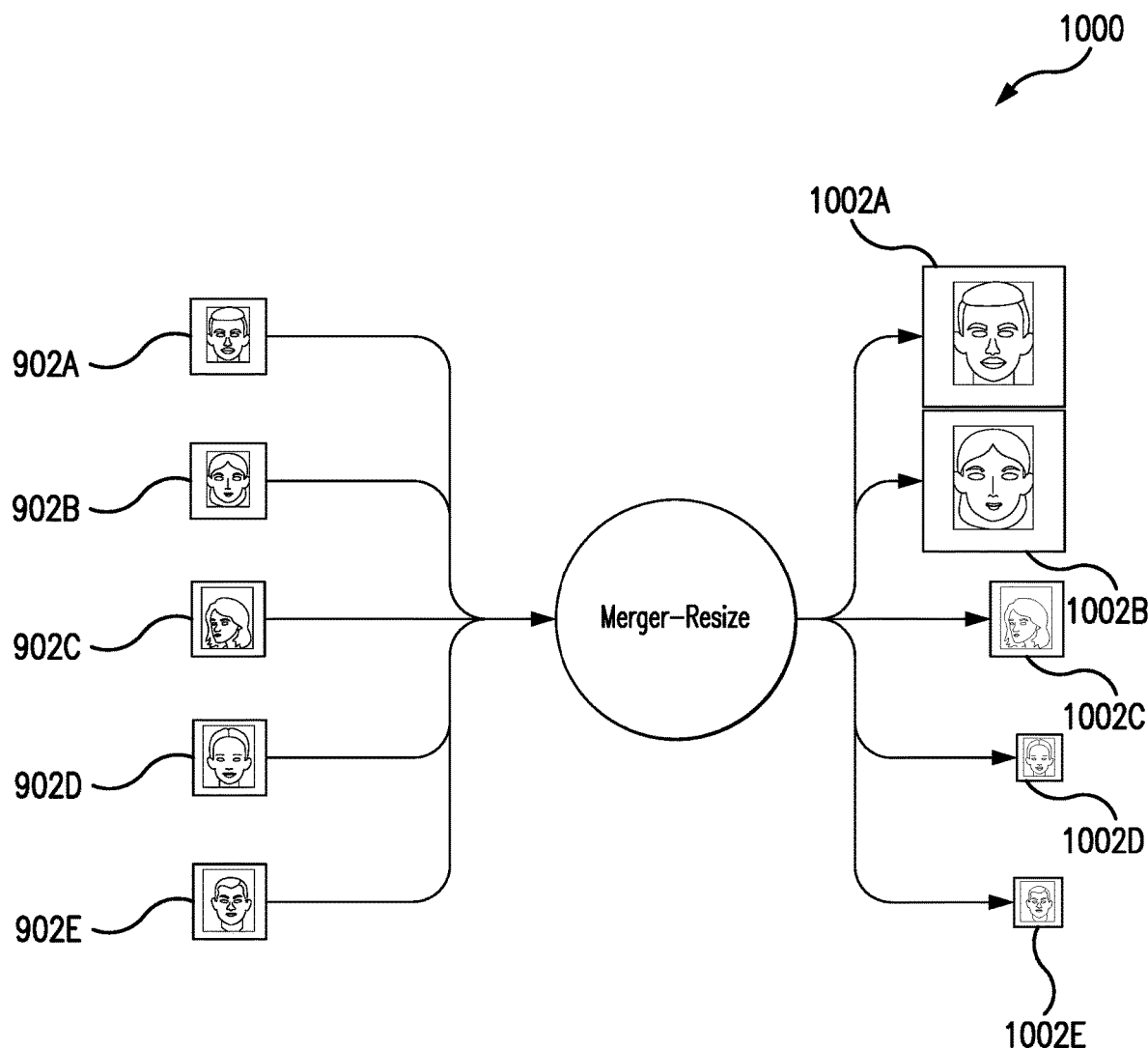
FIG. 10A is a diagram illustrating resizing video feeds received from various clients.

FIG. 10A is a diagram 1000 illustrating resizing video feeds received from various clients. Video streams 902A-E are resized into resized video streams 1002A-E. As illustrated in diagram 1000, the sizes of video streams 1002A-E. The sizes may be selected according to any the criteria and sorting techniques described above with respect to step 608 in FIG. 6. The sizes may be selected such that they fit in the aggregated video stream as illustrated in FIG. 10B.

Figure 10B:
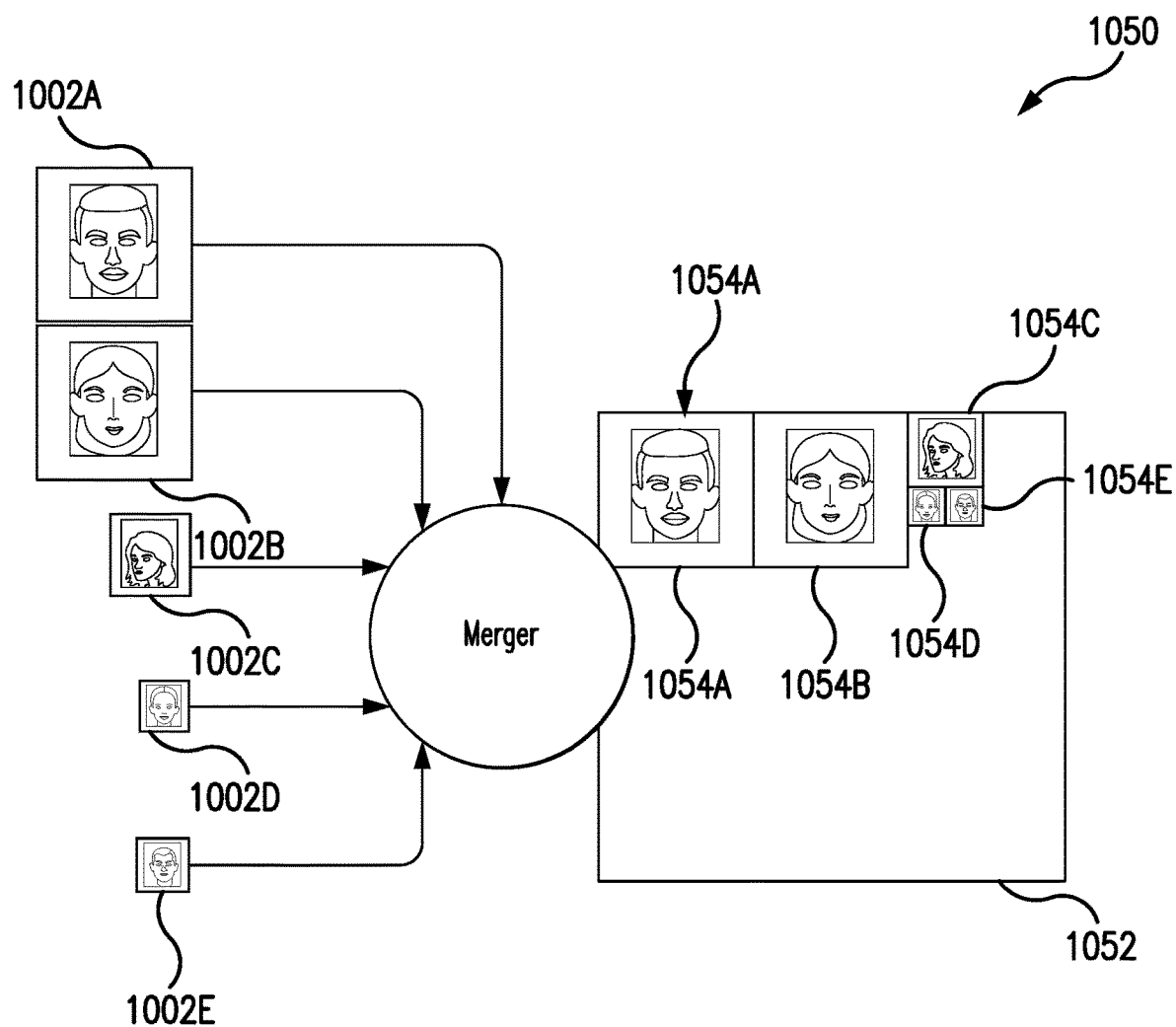
FIG. 10B is a diagram illustrating how the resized video feeds are merged into an aggregated video stream.

FIG. 10B is a diagram 1050 illustrating how the resized video feeds are merged into an aggregated video stream 1052. Each frame of aggregated video stream 1052 includes areas 1054A-E. Respective frames from resized streams 1002A-E are mapped to 1054A-E.

At 806, server 302 generates metadata describing how the video streams received from various clients are incorporated into a generated stream. The metadata may specify areas 1054A-E in FIG. 10B and areas 906A-E in FIG. 9A. The metadata may indicate which areas correspond to which video streams from which users. In one example, the area may be specified using a UV mapping. UV mapping a 3D modeling process of projecting a 3D model's surface to a 2D image for texture mapping. The metadata may be embedded in the "Z" coordinate of the aggregated frame. In another example, steganography may be used to specify the metadata. Steganography is the practice of representing information within another message or physical object, in such a manner that the presence of the information is not evident to human inspection. In a third example, the metadata may be sent separately, such as in a web service call or UDP/TCP message, for example containing a JSON file specifying the metadata.

At 808, server 302 sends the generated stream and metadata to device 306C.

At 810, device 306C decodes the streams from the aggregated stream based on the metadata. At step 812, device 306C generates avatars based on the video streams and renders a virtual environment including the video streams according to a virtual camera controlled by the user device 306C at step 814. This is illustrated in FIGS. 9B and 10C.

Figure 9B:
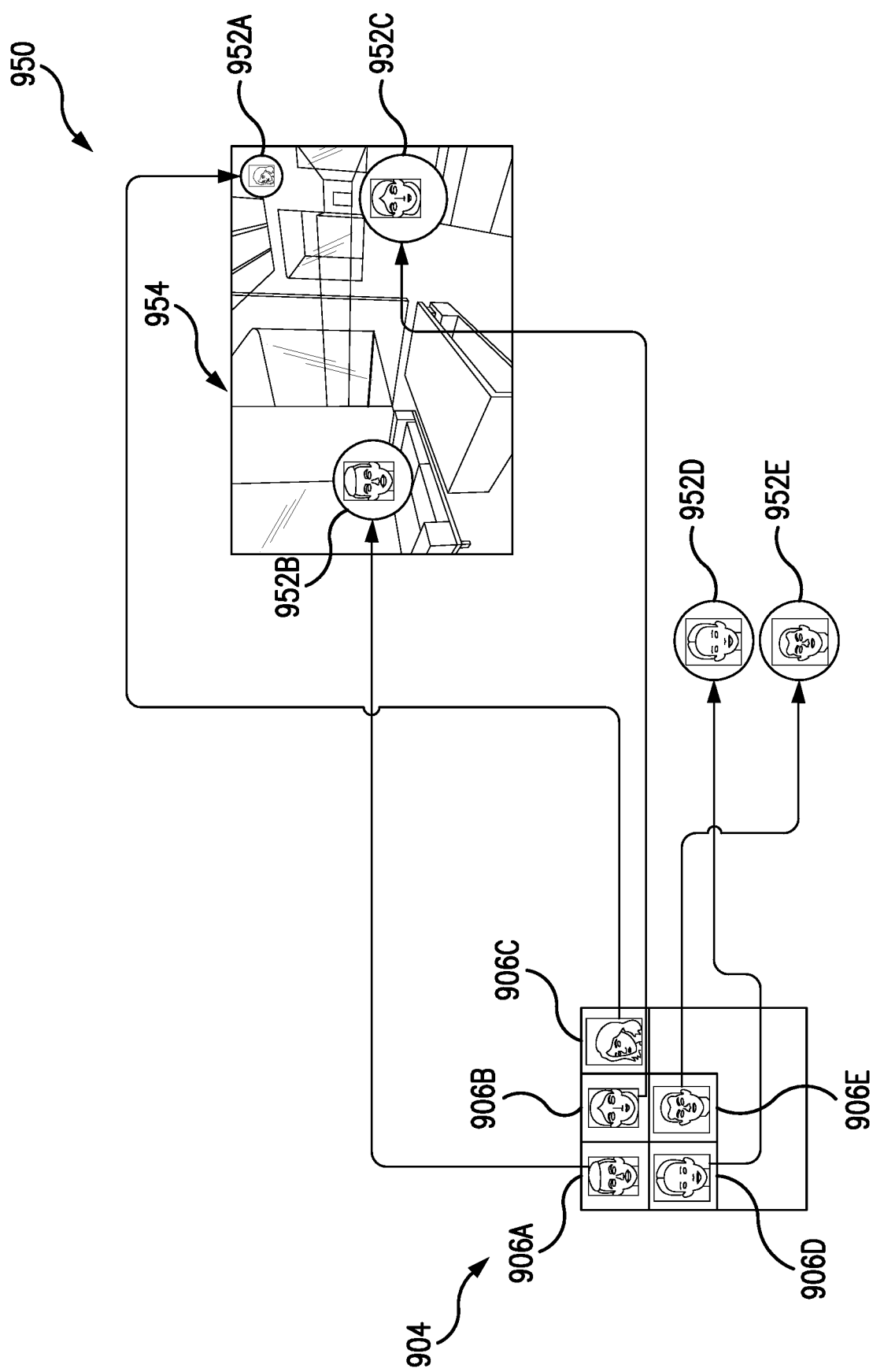
FIG. 9B is a diagram illustrating how the aggregated video stream is decoded into individual streams is to generate video avatars.

FIG. 9B is a diagram 950 illustrating how the aggregated video stream is decoded into individual streams to generate video avatars. Device 306C uses the metadata to identify which portions of aggregated video stream 904 corresponds to which avatars. In particular, the metadata specifies that areas 906A-E correspond to avatars 952A-E. In the example in diagram 950, the streams in areas 906A-C are texture mapped onto avatars within the user's field of view and thus appeared a rendered view 954 presented to a user. On the other hand, streams 952D and 952E correspond to avatars outside the user's field of view, thus there is no need to render them.

Figure 10C:
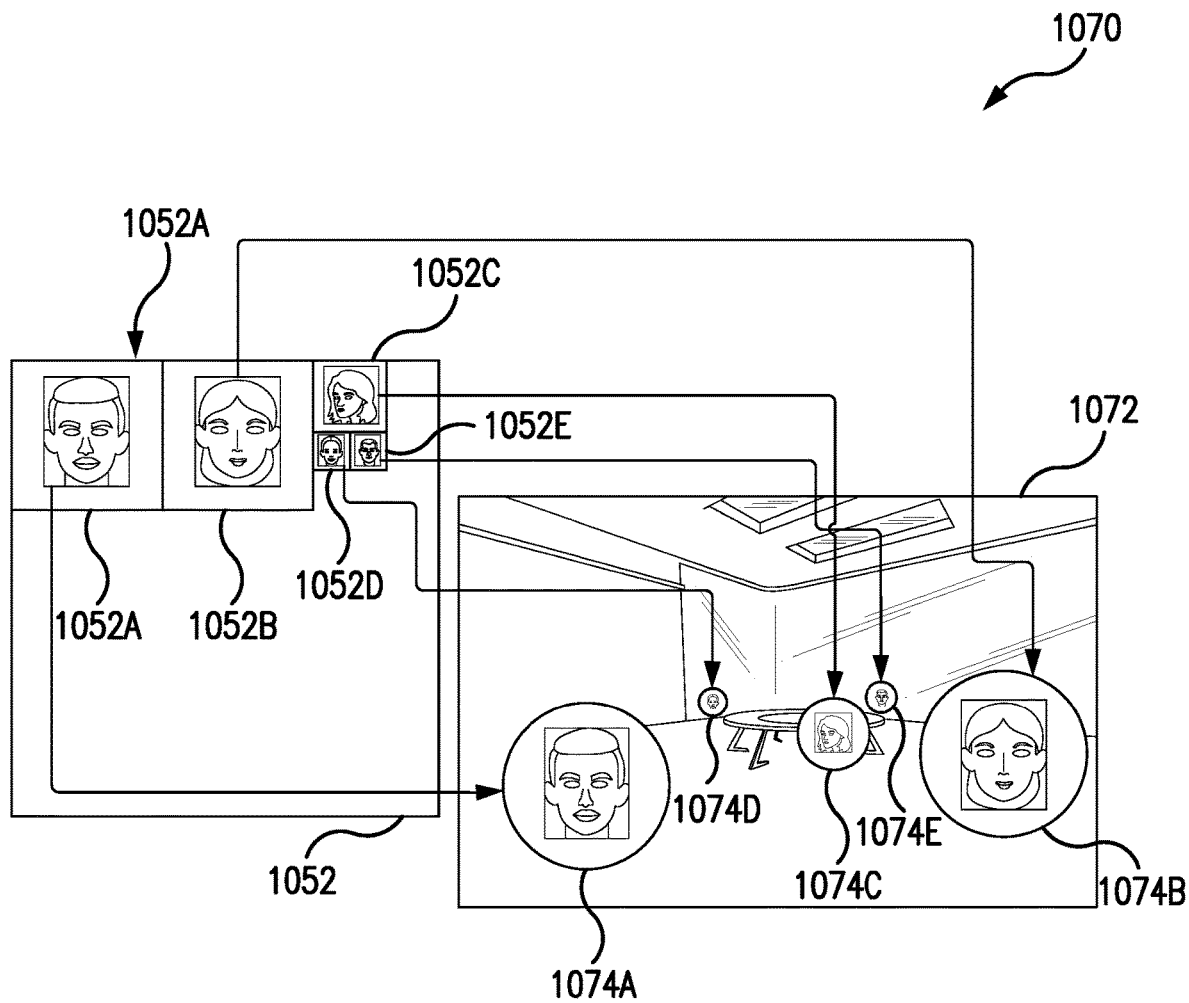
FIG. 10C is a diagram illustrating how the resized video feeds are decoded to generate video avatars.

FIG. 10C is a diagram 1070 illustrating how the resized video feeds are decoded to generate video avatars. Device 306C uses the metadata to identify which portions of aggregated video stream 1052 corresponds to which avatars. In particular, the metadata specifies that areas 1052A-E correspond to avatars 1074A-E. In the example in diagram 1070, the avatars located closer to the user's virtual camera have larger areas in aggregated video stream 1052 than those located further to the user's virtual camera.

In this way, multiple videos can be multiplexed into a single stream in a manner that is efficient and supports video compression.

Figure 11:
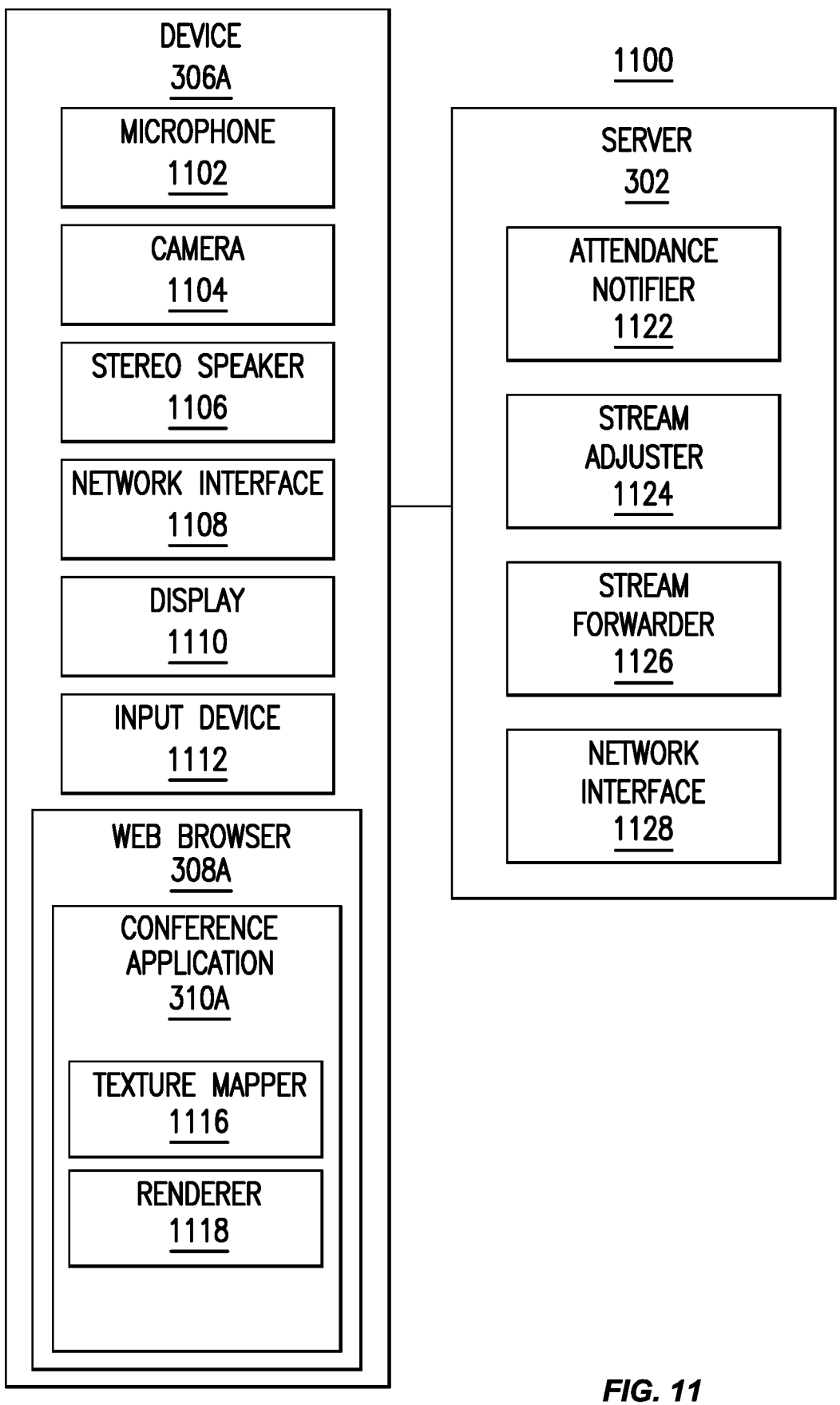
FIG. 11 is a diagram illustrating components of devices used to provide videoconferencing within a virtual environment.

Device Components and Computer Systems for Videoconferencing in a Virtual Environment FIG. 11 is a diagram of a system 1100 illustrating components of devices used to provide videoconferencing within a virtual environment. In various aspects, system 1100 can operate according to the methods described above.

Device 306A is a user computing device. Device 306A could be a desktop or laptop computer, smartphone, tablet, or wearable device (e.g., watch or head mounted device). Device 306A includes a microphone 1102, camera 1104, stereo speaker 1106, and input device 1112. Not shown, device 306A also includes a processor and persistent, non-transitory and volatile memory. The processors can include one or more central processing units, graphic processing units or any combination thereof.

Microphone 1102 converts sound into an electrical signal. Microphone 1102 is positioned to capture speech of a user of device 306A. In different examples, microphone 1102 could be a condenser microphone, electret microphone, moving-coil microphone, ribbon microphone, carbon microphone, piezo microphone, fiber-optic microphone, laser microphone, water microphone, or MEMs microphone.

Camera 1104 captures image data by capturing light, generally through one or more lenses. Camera 1104 is positioned to capture photographic images of a user of device 306A. Camera 1104 includes an image sensor (not shown). The image sensor may, for example, be a charge coupled device (CCD) sensor or a complementary metal oxide semiconductor (CMOS) sensor. The image sensor may include one or more photodetectors that detect light and convert it to electrical signals. These electrical signals captured together in a similar timeframe comprise a still photographic image. A sequence of still photographic images captured at regular intervals together comprise a video. In this way, camera 1104 captures images and videos.

Stereo speaker 1106 is a device which converts an electrical audio signal into a corresponding left-right sound. Stereo speaker 1106 outputs the left audio stream and the right audio stream generated by an audio processor to be played to device 306A's user. Stereo speaker 1106 includes both ambient speakers and headphones that are designed to play sound directly into a user's left and right ears. Example speakers includes moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 1108 is a software or hardware interface between two pieces of equipment or protocol layers in a computer network. Network interface 1108 receives a video stream from server 302 for respective participants for the meeting. The video stream is captured from a camera on a device of another participant to the video conference. Network interface 1108 also receives data specifying a three-dimensional virtual space and any models therein from server 302. For each of the other participants, network interface 1108 receives a position and orientation in the three-dimensional virtual space. The position and orientation are input by each of the respective other participants.

Network interface 1108 also transmits data to server 302. It transmits the position of device 306A's user's virtual camera used by renderer 1118 and it transmits video and audio streams from camera 1104 and microphone 1102.

Display 1110 is an output device for presentation of electronic information in visual or tactile form (the latter used for example in tactile electronic displays for blind people). Display 1110 could be a television set, computer monitor, head-mounted display, heads-up displays, output of a augmented reality or virtual reality headset, broadcast reference monitor, medical monitors mobile displays (for mobile devices), or Smartphone displays (for smartphones). To present the information, display 1110 may include an electroluminescent (ELD) display, liquid crystal display (LCD), light-emitting diode (LED) backlit LCD, thin-film transistor (TFT) LCD, light-emitting diode (LED) display, organic light-emitting diode (OLED) display, active-matrix organic light-emitting diode (AMOLED) display, plasma (PDP) display, or quantum dot (QLED) display.

Input device 1112 is a piece of equipment used to provide data and control signals to an information processing system such as a computer or information appliance. Input device 1112 allows a user to input a new desired position of a virtual camera used by renderer 1118, thereby enabling navigation in the three-dimensional environment. Examples of input devices include keyboards, mouse, scanners, joysticks, and touchscreens.

Web browser 308A and conference application 310A were described above with respect to FIG. 3. Conference application 310A includes texture mapper 1116 and renderer 1118.

Texture mapper 1116 texture maps the video stream onto a three-dimensional model corresponding to an avatar. Texture mapper 1116 may texture map respective frames from the video to the avatar. In addition, texture mapper 1116 may texture map a presentation stream to a three-dimensional model of a presentation screen.

Renderer 1118 renders, from a perspective of a virtual camera of the user of device 306A, for output to display 1110 the three-dimensional virtual space including the texture-mapped three-dimensional models of the avatars for respective participants located at the received, corresponding position and oriented in the direction. Renderer 1118 also renders any other three-dimensional models including for example the presentation screen.

Server 302 includes an attendance notifier 1122, a stream adjuster 1124, and a stream forwarder 1126.

Attendance notifier 1122 notifies conference participants when participants join and leave the meeting. When a new participant joins the meeting, attendance notifier 1122 sends a message to the devices of the other participants to the conference indicating that a new participant has joined. Attendance notifier 1122 signals stream forwarder 1126 to start forwarding video, audio, and position/orientation information to the other participants.

Stream adjuster 1124 receives a video stream captured from a camera on a device of a first user. Stream adjuster 1124 determines an available capacity and conducts the negotiation and merger described above with respect to FIGS. 6-8. Additionally or alternatively, stream adjuster 1124 may be located on device 306A, perhaps as part of conference application 310A.

Stream forwarder 1126 broadcasts position/orientation information, video, audio, and screen share screens received (with adjustments made by stream adjuster 1124). Stream forwarder 1126 may send information to the device 306A in response to a request from conference application 310A. Conference application 310A may send that request in response to the notification from attendance notifier 1122.

Network interface 1128 is a software or hardware interface between two pieces of equipment or protocol layers in a computer network. Network interface 1128 transmits the model information to devices of the various participants. Network interface 1128 receives video, audio, and screen share screens from the various participants.

System 1100 can also include a screen capturer, configured to capture a presentation stream, and an audio processor, configured to adjust volume of the received audio stream.

Figure 12:
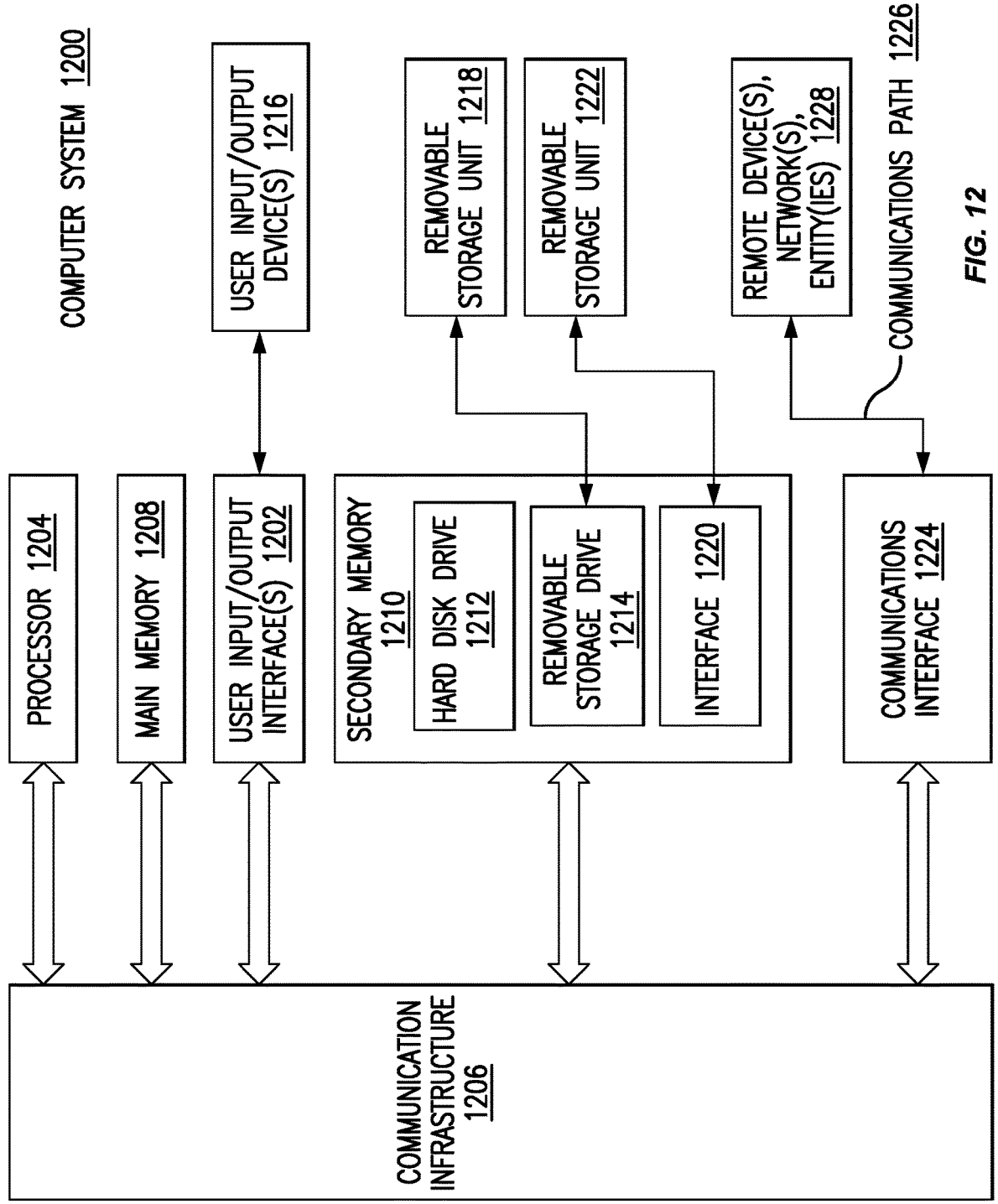
FIG. 12 is a block diagram of an example computer system useful for implementing various aspects.

Various aspects can be implemented, for example, using one or more computer systems, such as computer system 1200 shown in FIG. 12. Computer system 1200 can be used, for example, to implement a system for resituating virtual cameras and avatars in a virtual environment. For example, computer system 1200 can render a three-dimensional virtual environment, position and resituate virtual cameras, and generate and resituate perceived avatars corresponding to user avatars. Computer system 1200 can be any computer capable of performing the functions described herein.

Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1216, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, a tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/or any other computer data storage device. Removable storage drive 1214 reads from and/or writes to removable storage unit 1218 in a well-known manner.

According to an exemplary aspect, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communications interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it would be apparent to persons skilled in the relevant art(s) how to make and use aspects of this disclosure using data processing devices, computer systems and/or computer architectures other than that shown in FIG. 12. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary aspects, but should be defined only in accordance with the following claims and their equivalents.

What is claimed is:

1. A method for transferring video for generating avatars in a three-dimensional virtual environment, comprising:
   (a) receiving a first video stream captured from a first camera on a first device of a first user, the first camera positioned to capture photographic images of the first user;
   (b) receiving a second video stream captured from a second camera on a second device of a second user, the second camera positioned to capture photographic images of the second user;
   (c) generating a third video stream incorporating the first and second video streams and metadata specifying how the first and second video streams are incorporated into the third video stream, wherein the generating comprises:
   identifying a first area of frames from the third video stream;
   identifying a second area of the frames from the third video stream;
   for the respective frames of the third video stream:
   identifying a first current frame from the first video stream;
   identifying a second current frame from the second video stream;
   mapping the first current frame onto the first area of the respective frame; and
   mapping the second current frame onto the second area of the respective frame, wherein the metadata specifies the first and second areas and the mapping of the first and second areas to the respective first and second frames; and
   (d) transmitting the third video stream and the metadata to a third device of a third user such that the third device is configured to:
   (i) decode the first and second video streams from the third video stream based on the metadata,
   (ii) generate, based on the decoded first video stream, a first avatar in the three-dimensional virtual environment at a first position of the first avatar controlled by the first user,
   (iii) generate, based on the decoded second video stream, a second avatar in the three-dimensional virtual environment at a second position of the second avatar controlled by the second user, and
   (iv) render, for display to the third user and from a perspective of a virtual camera controlled by the third user, the three-dimensional virtual environment including the first and second avatars.

2. The method of claim 1, wherein the mapping the first current frame comprises resizing the first video stream to fit the first area.

3. The method of claim 2, wherein the resizing comprises changing a resolution of the first video stream.

4. The method of claim 1, wherein the mapping the first current frame comprises resizing the first video stream, and wherein the mapping the second current frame comprises resizing the second video stream such that the first video stream is a different size than the second video stream.

5. The method of claim 4, further comprising determining a relative size for the resized first and second video streams based on a priority value corresponding to a subscription level for the users of the respective first and second devices.

6. The method of claim 4, further comprising determining a relative size for the resized first and second video streams based on whether an audio stream corresponding to the respective first and second video streams is muted.

7. The method of claim 4, further comprising determining a relative size for the resized first and second video streams based on whether the virtual camera is located in the same audio zone as the first and second avatars.

8. The method of claim 4, further comprising determining a relative size for the resized first and second video streams based on a relative distance of the first and second avatars from the virtual camera.

9. The method of claim 4, further comprising determining a relative size for the resized first and second video streams based on how long the first and second video streams have been consumed by the third device.

10. The method of claim 4, further comprising determining a relative size for the resized first and second video streams based on a relative quality of the first and second video streams.

11. The method of claim 1, wherein the third device is configured to generate the first avatar (ii) by texture mapping respective frames of the first video stream onto a first three-dimensional model at the first position and is configured to generate the second avatar (iii) by texture mapping respective frames of the second video stream onto a second three-dimensional model at the second position.

12. The method of claim 1, further comprising:
(e) providing to the third device a web application executable by a web browser in the third device, the web application including instructions that, when executed in the web browser, cause the third device to perform steps (i)-(iv).

13. The method of claim 1, further comprising:
(f) generating metadata describing how the first and second video streams are incorporated into the third video stream; and
(g) transmitting the metadata to the third device such that the third device is configured to decode the first and second video streams (i) based on the metadata.

14. The method of claim 1, wherein the first and second areas are specified using a UV mapping.

15. The method of claim 1, wherein the first and second areas are specified using steganography.

16. A non-transitory computer readable medium including instructions for transferring video for generating avatars in a three-dimensional virtual environment that, when executed by a computing system, cause the computing system to perform operations comprising:
(a) receiving a first video stream captured from a first camera on a first device of a first user, the first camera positioned to capture photographic images of the first user;
(b) receiving a second video stream captured from a second camera on a second device of a second user, the second camera positioned to capture photographic images of the second user;
(c) generating a third video stream incorporating the first and second video streams and metadata specifying how the first and second video streams are incorporated into the third video stream, wherein the generating comprises:
identifying a first area of frames from the third video stream;
identifying a second area of the frames from the third video stream;
for the respective frames of the third video stream:
identifying a first current frame from the first video stream;
identifying a second current frame from the second video stream;
mapping the first current frame onto the first area of the respective frame; and
mapping the second current frame onto the second area of the respective frame, wherein the metadata specifies the first and second areas and the mapping of the first and second areas to the respective first and second frames; and
(d) transmitting the third video stream and the metadata to a third device of a third user such that the third device is configured to:
(i) decode the first and second video streams from the third video stream based on the metadata,
(ii) generate, based on the first decoded video stream, a first avatar in the three-dimensional virtual environment at a first position controlled by the first user,
(iii) generate, based on the second decoded video stream, a second avatar in the three-dimensional virtual environment at a second position controlled by the second user, and
(iv) render, for display to the third user and from a perspective of a virtual camera controlled by the third user, the three-dimensional virtual environment including the first and second avatars.

17. The non-transitory computer readable medium of claim 16, wherein the mapping the first current frame comprises resizing the first video stream to fit the first area.

18. A method for generating a three-dimensional virtual environment using a multiplexed video stream, the method comprising:
(a) receiving an aggregated video stream incorporating a first video stream captured from a first camera on a first device of a first user, the first camera positioned to capture photographic images of the first user, and a second video stream captured from a second camera on a second device of a second user, the second camera positioned to capture photographic images of the second user and metadata specifying how the first and second video streams are incorporated into the aggregated video stream;
(b) decoding the first and second video streams from the aggregated video stream based on the metadata;
(c) generating, based on the first decoded video stream, a first avatar in the three-dimensional virtual environment at a first position controlled by the first user;
(d) generating, based on the second decoded video stream, a second avatar in the three-dimensional virtual environment at a second position controlled by the second user; and
(e) rendering, for display to a third user and from a perspective of a virtual camera controlled by the third user, the three-dimensional virtual environment including the first and second avatars.

* * * * *